United States Patent
Edelhaus et al.

(10) Patent No.: US 10,044,524 B1
(45) Date of Patent: *Aug. 7, 2018

(54) ETHERNET CONTROLLER WITH INTEGRATED TSN/AVB CONTROL POINT AND TIME SLAVE

(71) Applicant: Aquantia Corporation, San Jose, CA (US)

(72) Inventors: Simon Edelhaus, San Ramon, CA (US); Alexey Andriyanov, Novgorod (RU)

(73) Assignee: Aquantia Corp., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,250

(22) Filed: Sep. 26, 2016

Related U.S. Application Data

(63) Continuation-in-part of application No. 14/858,918, filed on Sep. 18, 2015.

(51) Int. Cl.
*H04L 12/46* (2006.01)
*H04L 29/06* (2006.01)
*H04L 12/751* (2013.01)
*G06F 13/42* (2006.01)
*G06F 1/32* (2006.01)

(52) U.S. Cl.
CPC .......... *H04L 12/462* (2013.01); *G06F 1/3287* (2013.01); *G06F 13/4282* (2013.01); *H04L 45/02* (2013.01); *H04L 65/608* (2013.01); *G06F 2213/0026* (2013.01)

(58) Field of Classification Search
CPC ........... H04N 21/64322; H04N 21/234; H04N 21/43635
See application file for complete search history.

(56) References Cited

U.S. PATENT DOCUMENTS

| | | | |
|---|---|---|---|
| 8,179,910 B2 * | 5/2012 | Diab | H04L 12/2805 370/401 |
| 2005/0111477 A1 * | 5/2005 | Ghanma | H04L 12/413 370/445 |

(Continued)

OTHER PUBLICATIONS

"Understanding IEEE 1722", Presentation slides by Robert Boatright, Mar. 9, 2009, Vancouver, BC, 33 pages.

(Continued)

*Primary Examiner* — Ninos Donabed
(74) *Attorney, Agent, or Firm* — Lance Kreisman; Peninsula Patent Group

(57) ABSTRACT

An Ethernet adapter module for interfacing a network endpoint device to an Ethernet network is disclosed. The Ethernet adapter module includes an Ethernet medium access controller (MAC) and an Ethernet physical layer device (PHY). The Ethernet MAC includes a processor and Time Sensitive Networking and/or Audio Video Bridging (TSN/AVB) state machines that cooperate with the processor to (1) identify a TSN/AVB request from the network endpoint device, and (2) discover a network topology along which to transfer data between the network endpoint device and a second network endpoint device in accordance with a predetermined Quality of Service (QoS). The Ethernet PHY is coupled to the Ethernet MAC and includes timestamp logic to apply a timing reference to the data being transferred.

14 Claims, 4 Drawing Sheets

(56) References Cited

U.S. PATENT DOCUMENTS

| | | | |
|---|---|---|---|
| 2008/0285573 A1* | 11/2008 | Diab | H04L 12/2805 |
| | | | 370/401 |
| 2008/0285981 A1* | 11/2008 | Diab | H04L 12/2805 |
| | | | 398/154 |
| 2009/0160943 A1* | 6/2009 | Badt, Jr. | H04L 41/00 |
| | | | 348/180 |
| 2009/0225743 A1* | 9/2009 | Nicholls | H04J 3/0688 |
| | | | 370/350 |
| 2011/0035511 A1 | 2/2011 | Biederman | |
| 2011/0051741 A1* | 3/2011 | Diab | H04L 12/2805 |
| | | | 370/401 |
| 2011/0058811 A1* | 3/2011 | Diab | H04L 12/2805 |
| | | | 398/58 |
| 2011/0280259 A1 | 11/2011 | Diab et al. | |
| 2012/0189018 A1* | 7/2012 | Diab | H04L 12/2805 |
| | | | 370/401 |
| 2012/0327300 A1 | 12/2012 | Hutchings et al. | |
| 2013/0007288 A1* | 1/2013 | Olsen | H04L 65/1069 |
| | | | 709/227 |
| 2015/0052257 A1 | 2/2015 | Mora et al. | |

OTHER PUBLICATIONS

XMOS Sales Literature, "Ethernet AVB Networking Solutions", 2014, 4 pages.
Betanews.com article: "Broadcom Looks to Replace HDMI with Ethernet", Mar. 31, 2009, 3 pages.

* cited by examiner

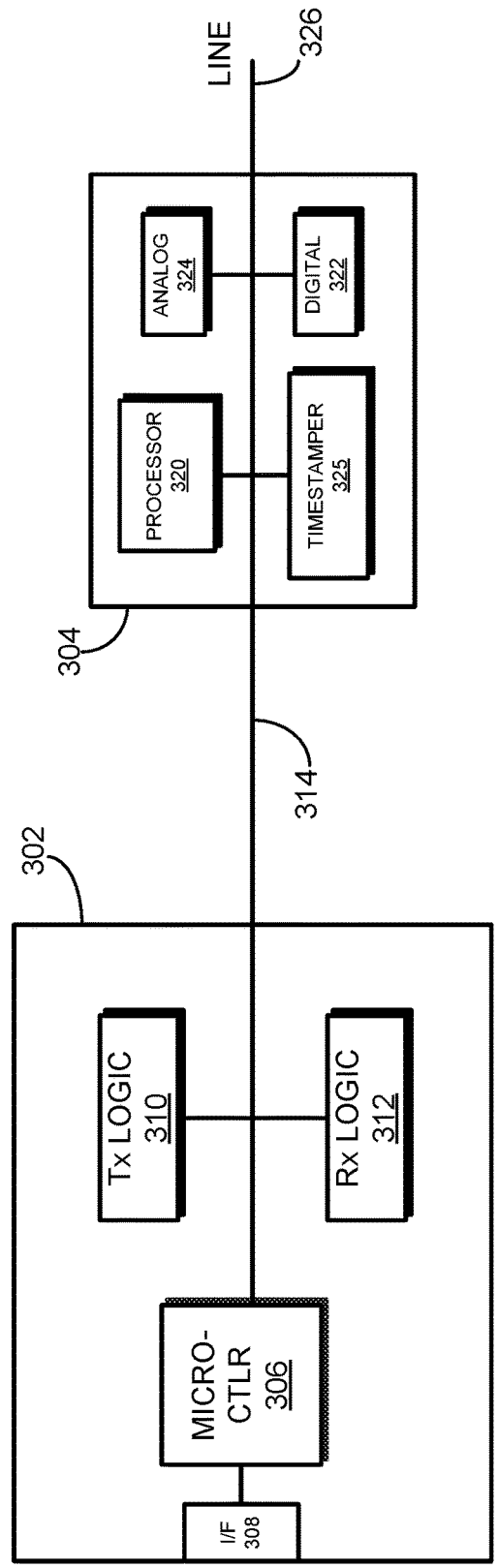

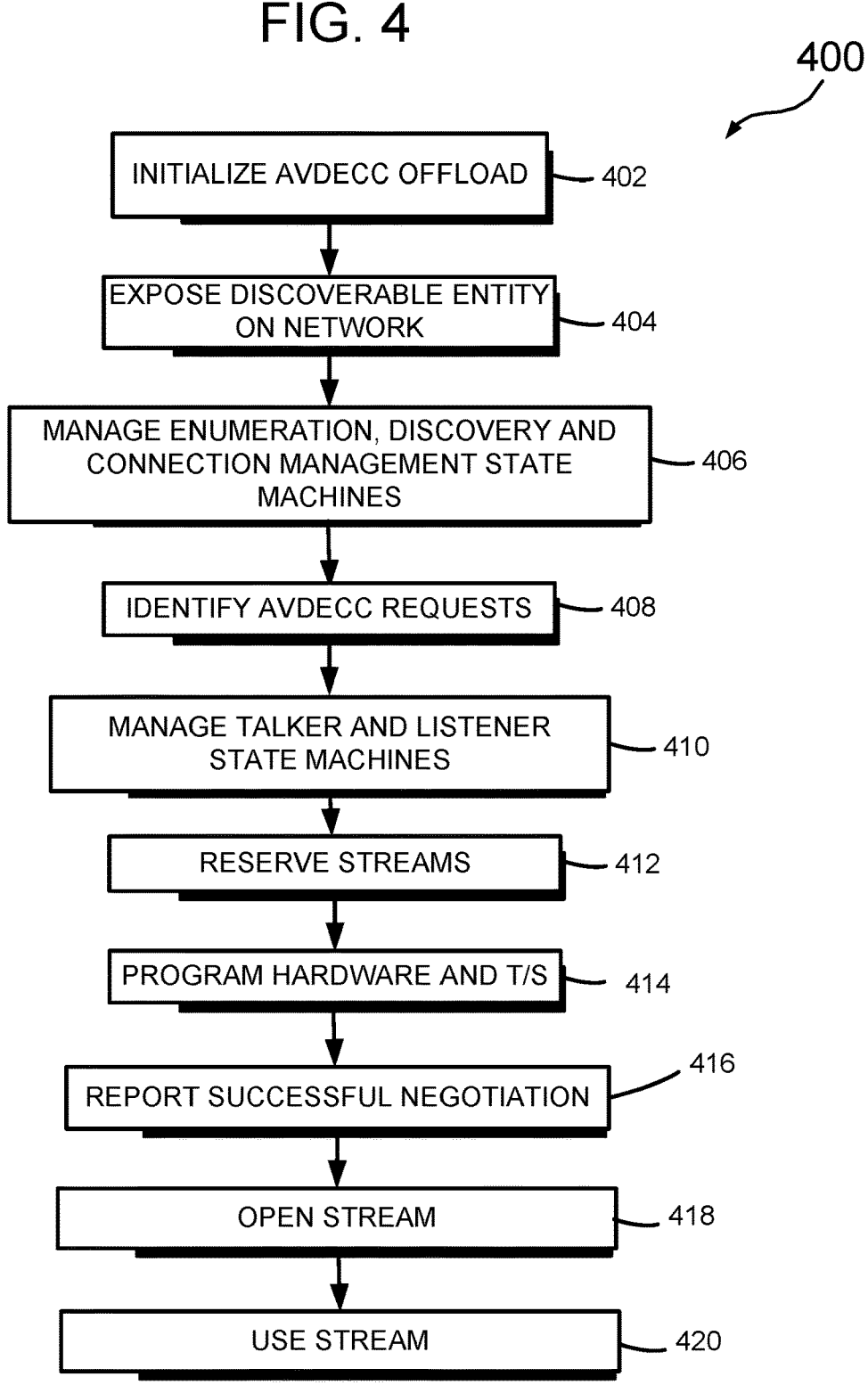

ETHERNET CONTROLLER WITH INTEGRATED TSN/AVB CONTROL POINT AND TIME SLAVE

CROSS-REFERENCE TO RELATED APPLICATIONS

This application is a Continuation-In-Part that claims priority to U.S. application Ser. No. 14/858,918, filed Sep. 18, 2015, entitled ETHERNET CONTROLLER WITH INTEGRATED AVB CONTROL POINT AND TIME SLAVE, which is incorporated herein by reference in its entirety.

TECHNICAL FIELD

The disclosure herein relates to communications systems, and more specifically to local area network systems and methods.

BACKGROUND

Multi-media data streaming represents an increasingly large portion of overall Internet traffic. One conventional method to enable multi-media data transfers over a proprietary high speed connection with very precise timing and high link stability involves an SDI interface. The SDI interface generally provides for data speeds up to 6 Gbps.

Recently, to achieve the same high precision and stable link quality, Time Sensitive Networking (TSN) and Audio Video Bridge (AVB) standards have been ratified to enable high-speed synchronized multi-media data transfers over high-speed local area networks, such as Ethernet and 10GBASE-T. With this new approach, conventional adapters (i.e. Ethernet and WiFi) are used to transfer high precision, broadcast quality multi-media, instead of proprietary SDI ones. As with any other multimedia distribution system, processing functions on the end point (for example a computer, laptop, tablet, automotive embedded device, video disc recorder, transcoder, or video end point) associated with the multimedia data are often carried out by large, high-power processors. This may be undesirable depending on the application. When the multimedia data is carried by such high-power processors, they need to remain on all the time to be able to carry the data, resulting in the inability of the end point to enter sleep mode, thus causing increased power consumption. Another concern associated with TSN and/or AVB standards running on these processors, is the need to support the complete TSN and/or AVB protocol stack in the software installed on the Operating System (OS), with all the potential compatibility problems and lack of essential TSN and/or AVB services associated with this.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3 illustrates a network adapter card for use in the system of FIG. 2.

FIG. 4 illustrates a flowchart of steps for one embodiment of a method for processing multi-media data in an Ethernet network.

DETAILED DESCRIPTION

Embodiments of networking systems, adapter cards and associated methods are disclosed herein. One embodiment of an Ethernet adapter module for interfacing a network endpoint device to an Ethernet network is disclosed. The Ethernet adapter module includes an Ethernet medium access controller (MAC) and an Ethernet physical layer device (PHY). The Ethernet MAC includes a processor and offload hardware that together with the processor perform audio video discovery, enumeration, connection management and control (AVDECC) for media devices connected to Ethernet network and available inside the TSN/AVB domain functionality (using IEEE 1722.1 standard terminology). Additional framing and de-framing of the multimedia data per various encapsulation standards used may also be part of the offload hardware. The Ethernet PHY is coupled to the Ethernet MAC and includes timestamp logic to apply a timing reference to the data being transferred.

In a further embodiment, a system is disclosed including a first TSN/AVB network endpoint device and an Ethernet adapter module for interfacing the first TSN/AVB network endpoint device to an Ethernet network. The endpoint device has processing hardware and a control application interface. The Ethernet adapter module includes an Ethernet medium access controller (MAC) and an Ethernet physical layer device (PHY). The Ethernet MAC includes a processor, and Time Sensitive Network (TSN) and/or Audio Video Bridging (AVB) state machines that cooperate with the processor to (1) identify a TSN/AVB request (a TSN and/or an AVB request) from the network endpoint device, and (2) discover a network topology along which to transfer data between the network endpoint device and a second network endpoint device in accordance with a predetermined Quality of Service (QoS). The PHY is coupled to the Ethernet MAC and includes timestamp logic to apply a timing reference to the data being transferred.

In an additional embodiment, a method of operation between a TSN/AVB network endpoint device and an Ethernet network adapter is disclosed. The method includes opening an application with the TSN/AVB network endpoint device, the application requesting TSN/AVB services and offloading processing of the TSN/AVB services to the Ethernet network adapter. The processing of the TSN/AVB services includes TSN/AVB discovery, enumeration and connection management, reserving streams or redundant streams for transferring the TSN/AVB data, and timestamping the TSN/AVB data.

Figure 1:
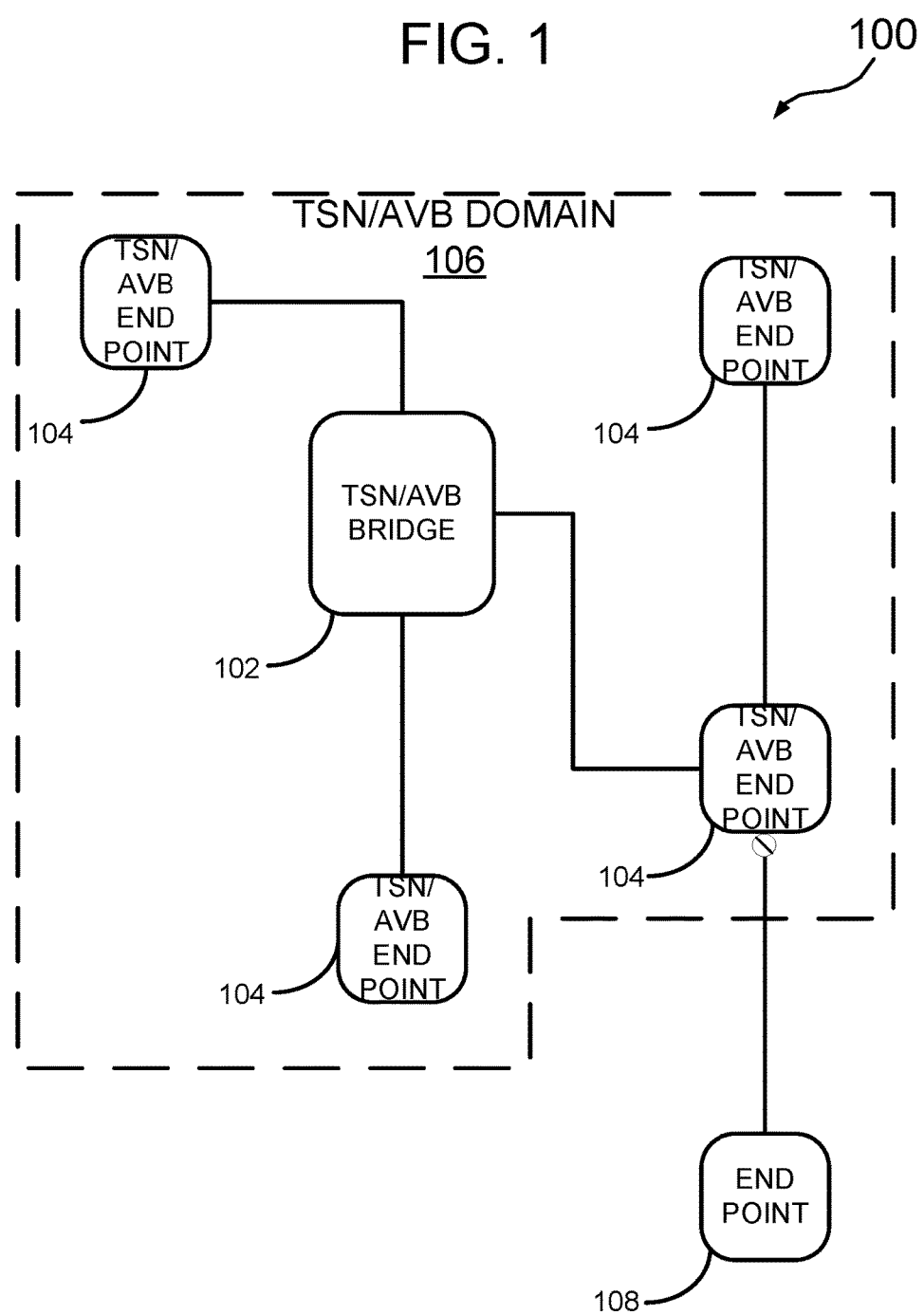
FIG. 1 illustrates a high-level block diagram of a TSN/AVB domain of interconnected TSN/AVB end point devices and a TSN/AVB bridge.

FIG. 1 illustrates a collection of devices that are interconnected via Ethernet to form a network, generally designated 100. The network includes a Time Sensitive Network (TSN) and/or Audio Video Bridge (AVB) 102 that provides time-synchronized, low latency streaming capabilities for audio and video data that guarantees stream bandwidth reservation. TSN is a new generation of AVB, and backwards compatible with AVB. Throughout this disclosure, TSN and/or AVB support is identified by the acronym "TSN/AVB." The bridge 102 includes multiple ports that connect with multiple TSN/AVB end point devices 104. A given end point device may take the form of a computer, laptop, tablet, automotive embedded device, video disk recorder, transcoder, and so forth. Each TSN/AVB end point device must be able to support a variety of TSN/AVB-related IEEE standards including:

- 802.1AS: Timing and Synchronization for Time-Sensitive Applications
- 802.1ASbt: gPTP Timing With Industrial Enhancements (supports multiple time domains, single-step synchronization, and routers)
- 802.1Qat: Stream Reservation Protocol (SRP)
- 802.1Qav: Forwarding and Queuing for Time-Sensitive Streams
- 802.1Qbv and 802.1Qbu: Time Aware Scheduling and Frame Preemption (provides ultra-low latency scheduled traffic in switches, and jumbo frames to run over TSN/AVB)
- 802.1Qca and 802.1Qcc: Path Control and Reservation, Enhancements to SRP (makes things fully Plug and Play)
- 802.1BA: Audio Video Bridging Systems
- 802.1CB: Redundant Streams, Frame Replication and Elimination (provides enhanced reliability)
- 1722: A Layer 2 transport protocol for media talker and listener endpoints
- 1733: A Layer 3 transport protocol for RTP and RTPC applications
- P1722.1: Responsible for TSN/AVB device discovery, enumeration, connection management and control for 1722-based devices.

In addition to using IEEE 1722.1 for discovery and enumeration as normal workflow, alternative methods of discovery in conjunction with normal stream reservation and media transfer procedures may be used. One method uses a separate electrical line for control, while data is still transferred through Ethernet. With another approach, talkers and listeners publish themselves as services using mDNS protocol. Thus, alternative methods to IEEE 1722.1 may be employed for offloading to the Ethernet controller as well as the standard AVDECC methods mentioned here that we use throughout for illustration purposes.

With continued reference to FIG. 1, the multiple endpoint devices that support the TSN/AVB Standards together form a TSN/AVB domain 106. End point devices that do not support TSN/AVB services, such as end point device 108, are outside of the TSN/AVB domain, and are not TSN/AVB capable to the extent that certain Quality of Service standards are guaranteed. To enable TSN/AVB end point devices to communicate via Ethernet networks, Ethernet adapter cards are often employed.

Figure 2:
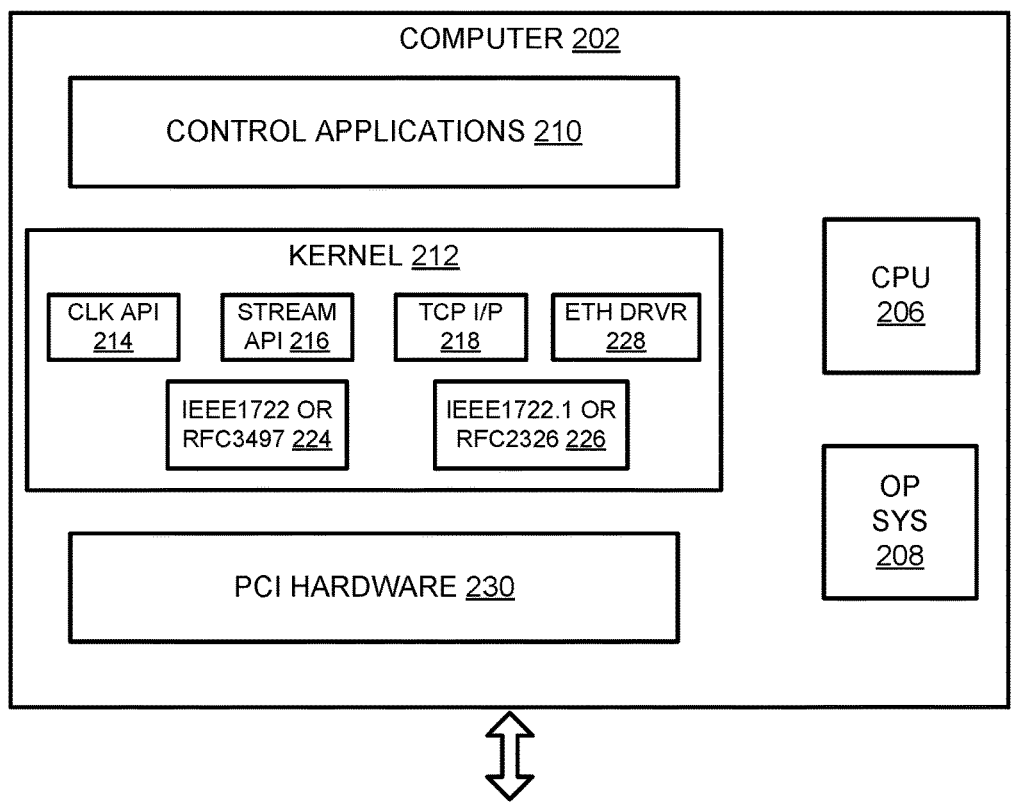
FIG. 2 illustrates a TSN/AVB end point device of FIG. 1 in further detail, together with a network adapter card.
Figure 2:
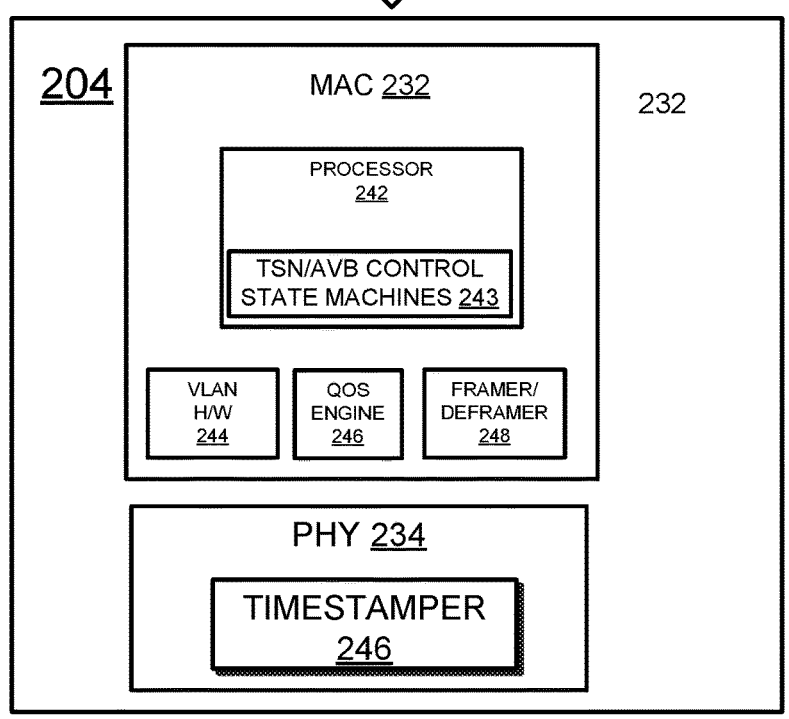

FIG. 2 illustrates one specific embodiment of a TSN/AVB end point device 202 in the form of a computer, and coupled to an Ethernet adapter card 204. The computer 202 generally includes a computer processing unit (CPU) 206, memory (not shown) and software in the form of an operating system 208, control applications 210, and a system kernel 212. To support TSN/AVB-related services, the kernel generally includes timing and synchronization API 214, a streaming API 216, network protocol stack, commonly TCP/IP 218, drivers for media streaming like IEEE 1722 and RFC 3497 media 224, implementation of endpoint discovery, enumeration, connection and control protocol like IEEE 1722.1 or RFC 2326 and Ethernet network adapter hardware driver 228. Thus, for some operating modes, the kernel is capable of interacting with the CPU 206 to support TSN/AVB-related processing. However, as explained below, power consumption and higher efficiency may be attainable in some operating modes by offloading TSN/AVB discovery, enumeration and connection management to the Ethernet network adapter card 204. Input/Output (I/O) hardware 230, such as a PCIe interface, provides for data transfers between the CPU 206 and other devices, such as the Ethernet network adapter card 204.

With continued reference to FIG. 2, the Ethernet adapter card 204 includes an Ethernet media access controller (MAC) 232 and an Ethernet physical layer device (PHY) 234. The MAC 232 includes AVDECC offload hardware that support the relevant TSN/AVB Standards necessary to carry out TSN/AVB-related processing in lieu of processing by the computer CPU 206. The MAC 232 employs processing resources such as a processor 242 responsive to software including TSN/AVB control state machines 243, VLAN tagging hardware 244, QOS Engine 246 and Framer De-Framer 248 that interface with the TSN/AVB state machines 243.

Further referring to FIG. 2, for one specific embodiment, the Ethernet PHY 234 takes the form of an NBASE-T Ethernet transceiver chip that includes a timestamper 246. The timestamper generates a timestamp, with respect to a centralized time reference, for data that is transmitted or received. In this manner, time synchronization may be maintained between TSN/AVB end point devices.

FIG. 3 illustrates one specific embodiment of the Ethernet network adapter card of FIG. 2, generally designated 300, corresponding to the Ethernet network adapter card of FIG. 2 and showing many of the features illustrated in FIG. 2, albeit in physical form rather than logical form. The card 300 includes a media access controller (MAC) 302 that connects to a physical device (PHY) 304 in the form of an Ethernet transceiver. The MAC 302 includes a micro-controller or processor 306 that employs an input/output I/O interface 308, such as PCIe, and includes respective transmit and receive logic circuits 310 and 312. The logic circuits couple to the PHY via an MII like KR interface such as (but not limited to) XFI, USXGMII, XGMII, SGMII interface 314. The PHY includes a PHY processor 320, digital logic 322 and analog logic 324. The PHY includes a timestamper 325 (corresponding to the timestamper 246 of FIG. 2) for associating a timing reference for data transferred between the MAC and PHY. A line interface 326 couples the Ethernet card to an Ethernet network.

In operation, the Ethernet network adapter 300 carries out discovery, enumeration and connection management and audio video data framing and de-framing while minimizing usage of the end point host CPU 206 and making support of TSN/AVB on host operating system 208 unnecessary. FIG. 4 illustrates steps employed during one embodiment of audio video discovery, enumeration, connection and streaming offload in a network adapter. In the illustrated embodiment, AVDECC could be initialized, at 402, by either an Ethernet link going up, switching to sleep mode with sleep proxy taking control on network link, or starting a TSN/AVB application.

With the Ethernet network adapter card 300 interfaced with the computer 202, a user may desire to open a streaming application that may involve, for example, video data. As another possible scenario, Operating system 208 switches the computer 202 to low power mode, passing network link control to MAC 232. An audio video endpoint managed by processor 242 is exposed as a discoverable entity according to a control protocol, at 404. Discovery, enumeration and connection management state machines are then managed by processor 242, at 406, allowing an AVDECC request for the discoverable entity from network to be identified, at 408. Generally, an AVDECC request is handled by TSN/AVB-related drivers that have been offloaded to the network adapter card, which initiates and manages talker and listener state machines, at 410. More specifically, an end-to-end path for streaming the video data from its source to an end-point may be determined and network stream (and redundant stream) resources may be reserved, at 412 (such as various coder/decoders, fixed data rates, variable data rates, VLANs, stream bandwidth, etc.). Generally, the stream and redundant stream reservations are negotiated for the end-to-end data transfer to ensure a certain Quality of Service (QoS).

With additional reference to FIG. 4, the Ethernet network adapter hardware may then be programmed, at 414, which generally involves configuring the timestamper 246 in the PHY 234, and carrying out appropriate QoS and VLAN programming in the MAC 232. Once the programming is completed, the MAC 232 may report to the application that a successful path negotiation is complete, at 416. In one of the embodiments, path negotiation completion is reported to application 210, which runs on the host CPU 206. In other embodiment, completion is reported to software which runs on the embedded processor 242.

Further referring to FIG. 4, a network stream that has been opened, at 418, may be using one or several of the network protocols like TCP/IP, IEEE 1722 by the various TSN/AVB-related extensions or drivers that have been offloaded into the network adapter MAC. The stream and redundant stream may then be used for media data transfers at 420.

Use of the network adapter card to identify the network topology and negotiate the stream and redundant stream resources allows the computer CPU 206 to operate in a low-power mode, or allow it to handle other tasks while AVDECC and media stream processing are handled by the Ethernet network adapter card 204. This also allows accessing the TSN/AVB network on hosts which do not have full support of TSN/AVB discovery, enumeration, connection management and control. Thus, by offloading the TSN/AVB-related extensions or drivers into the MAC 232 of the Ethernet network adapter card, significant power savings may be realized.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. An Ethernet apparatus, comprising:
  an Ethernet adapter module for interfacing a network endpoint device to an Ethernet network, the Ethernet adapter module including:
    a network endpoint interface for connecting to the network endpoint device;
    an Ethernet network interface for connecting to the Ethernet network;
    an Ethernet medium access controller (MAC), the Ethernet MAC including
      a processor,
      Time Sensitive Networking or Audio Video Bridging (TSN/AVB) state machines that cooperate with the processor to (1) identify a TSN/AVB request from the network endpoint device, and (2) discover a network topology along which to transfer data between the network endpoint device and a second network endpoint device in accordance with a predetermined Quality of Service (QoS); and an Ethernet physical layer device (PHY) coupled to the Ethernet MAC including timestamp logic to apply a timing reference to the data being transferred; and wherein for a first operating mode, the first TSN/AVB network endpoint device performs TSN/AVB-related processing, and for a second operating mode, the TSN/AVB-related processing is off-loaded to the Ethernet adapter module.

2. The Ethernet adapter module according to claim 1, wherein the Ethernet MAC further includes a clock slave state machine.

3. The Ethernet adapter module according to claim 1, wherein the Ethernet PHY comprises an NBASE-T transceiver chip.

4. The Ethernet adapter module according to claim 1, wherein the state machines operate in accordance with at least one standard from the group comprising IEEE 1722.1, 802.1BA, 802.1Qat, 1588 PTPv2, 802.1AS, 802.1ASbt, 802.1Qbv, 802.1Qbu, 802.1Qca, 802.1Qcc and 802.1CB.

5. The Ethernet adapter module according to claim 1, wherein the Ethernet MAC further includes a PCIe interface to communicate with the network endpoint device.

6. A system comprising:
a first TSN/AVB network endpoint device having processing hardware and a control application interface;
an Ethernet adapter module for interfacing the first TSN/AVB network endpoint device to an Ethernet network, the Ethernet adapter module including
an Ethernet medium access controller (MAC), the Ethernet MAC including
a processor,
Time Sensitive Networking or Audio Video Bridging (TSN/AVB) state machines that cooperate with the processor to (1) identify a TSN/AVB request from the network endpoint device, and (2) discover a network topology along which to transfer data between the network endpoint device and a second network endpoint device in accordance with a predetermined Quality of Service (QoS), and an Ethernet physical layer device (PHY) coupled to the Ethernet MAC including timestamp logic to apply a timing reference to the data being transferred; and wherein for a first operating mode, the first TSN/AVB network endpoint device performs TSN/AVB-related processing, and for a second operating mode, the TSN/AVB-related processing is off-loaded to the Ethernet adapter module.

7. The system according to claim 6, wherein for the second operating mode, the first TSN/AVB network endpoint device operates in a reduced-power mode while the Ethernet adapter module performs the TSN/ABV-related processing.

8. The system according to claim 6, wherein the first TSN/AVB network endpoint device comprises a computer.

9. The system according to claim 6, wherein:
the Ethernet MAC further includes a clock slave state machine.

10. The system according to claim 6, wherein:
the Ethernet PHY comprises an NBASE-T transceiver chip.

11. The system according to claim 6, wherein the state machines operate in accordance with at least one standard from the group comprising IEEE 1722.1, 802.1BA, 802.1Qat, 1588 PTPv2, 802.1AS, 802.1ASbt, 802.1Qbv, 802.1Qbu, 802.1Qca, 802.1Qcc and 802.1CB.

12. The system according to claim 6, wherein:
the Ethernet MAC further includes a PCIe interface to communicate with the network endpoint device.

13. A method of operation between a TSN/AVB network endpoint device and an Ethernet network adapter, the method comprising:
a processor, Time Sensitive Networking or Audio Video Bridging (TSN/AVB) state machines that cooperate with the processor for opening an application with the TSN/AVB network endpoint device, the application requesting TSN/AVB services;
wherein for a first operating mode, performing TSN/AVB-related processing with the TSN/AVB network endpoint device;
for a second operating mode, offloading processing of the TSN/AVB services to the Ethernet network adapter;
wherein the processing of the TSN/AVB services includes
discovering a network topology for transferring TSN/AVB data between the TSN/AVB network endpoint device and a second TSN/AVB network device in accordance with a predetermined Quality of Service (QoS),
reserving streams for transferring the TSN/AVB data, and
timestamping the TSN/AVB data.

14. The method according to claim 13, wherein the TSN/AVB network endpoint device includes a processor, and wherein the processor operates in a low-power mode while the Ethernet network adapter carries out the processing of the TSN/AVB services.

* * * * *